(12) United States Patent
Larson

(10) Patent No.: US 7,304,769 B2
(45) Date of Patent: Dec. 4, 2007

(54) COLOR IMAGING DEVICES, COLOR IMAGE FORMING METHODS, AND COLOR IMAGE DATA PROCESSING METHODS

(75) Inventor: Bradley R. Larson, Meridian, ID (US)

(73) Assignee: Hewlett-Packard Development Company, L.P., Fort Collins, CO (US)

( * ) Notice: Subject to any disclaimer, the term of this patent is extended or adjusted under 35 U.S.C. 154(b) by 965 days.

(21) Appl. No.: 10/449,951

(22) Filed: May 30, 2003

(65) Prior Publication Data

US 2004/0240727 A1 Dec. 2, 2004

(51) Int. Cl.
*H04N 1/56* (2006.01)
*H04N 1/60* (2006.01)

(52) U.S. Cl. .................. 358/1.9; 382/518; 382/523; 382/525

(58) Field of Classification Search ................ 358/1.9, 358/518–523, 525; 382/162, 167
See application file for complete search history.

(56) References Cited

U.S. PATENT DOCUMENTS

| | | | |
|---|---|---|---|
| 5,666,437 A | 9/1997 | Vondran, Jr. | |
| 5,687,000 A * | 11/1997 | Nakaoka | ............... 358/518 |
| 5,717,507 A | 2/1998 | Vondran, Jr. | |
| 5,786,908 A * | 7/1998 | Liang | .................. 358/518 |
| 5,923,824 A | 7/1999 | Yokomizo | |
| 5,966,474 A | 10/1999 | Vondran, Jr. | |
| 6,008,907 A | 12/1999 | Vigneau et al. | |
| 6,028,683 A | 2/2000 | Vondran, Jr. | |
| 6,031,642 A | 2/2000 | Vondran, Jr. | |
| 6,040,925 A | 3/2000 | Vondran, Jr. | |
| 6,040,926 A | 3/2000 | Vondran, Jr. | |
| 6,049,400 A | 4/2000 | Vondran, Jr. | |
| 6,282,310 B1 | 8/2001 | Kadowaki | |
| 7,010,161 B2 * | 3/2006 | Kanai | ................... 382/167 |
| 2004/0184673 A1 * | 9/2004 | Watanabe | .............. 382/274 |
| 2004/0239966 A1 | 12/2004 | Larson | |
| 2006/0209320 A1 * | 9/2006 | Ariga | ................... 358/1.9 |

* cited by examiner

*Primary Examiner*—Scott A. Rogers
(74) *Attorney, Agent, or Firm*—Wells St. John, P.S.

(57) ABSTRACT

Color imaging devices, color image forming methods, and color image data processing methods are described. According to one embodiment, a color imaging device includes interface circuitry configured to access color image data comprising a plurality of initial values for a plurality of pixels of a first color space, translating circuitry coupled with the interface circuitry and configured to receive the initial values and to provide a plurality of respective translated values responsive to the received initial values, color space conversion circuitry coupled with the translating circuitry and configured to convert the translated values to a plurality of respective converted values of a second color space different than the first color space, and an image engine coupled with the color space conversion circuitry and configured to form a color image using the converted values of the second color space.

32 Claims, 3 Drawing Sheets

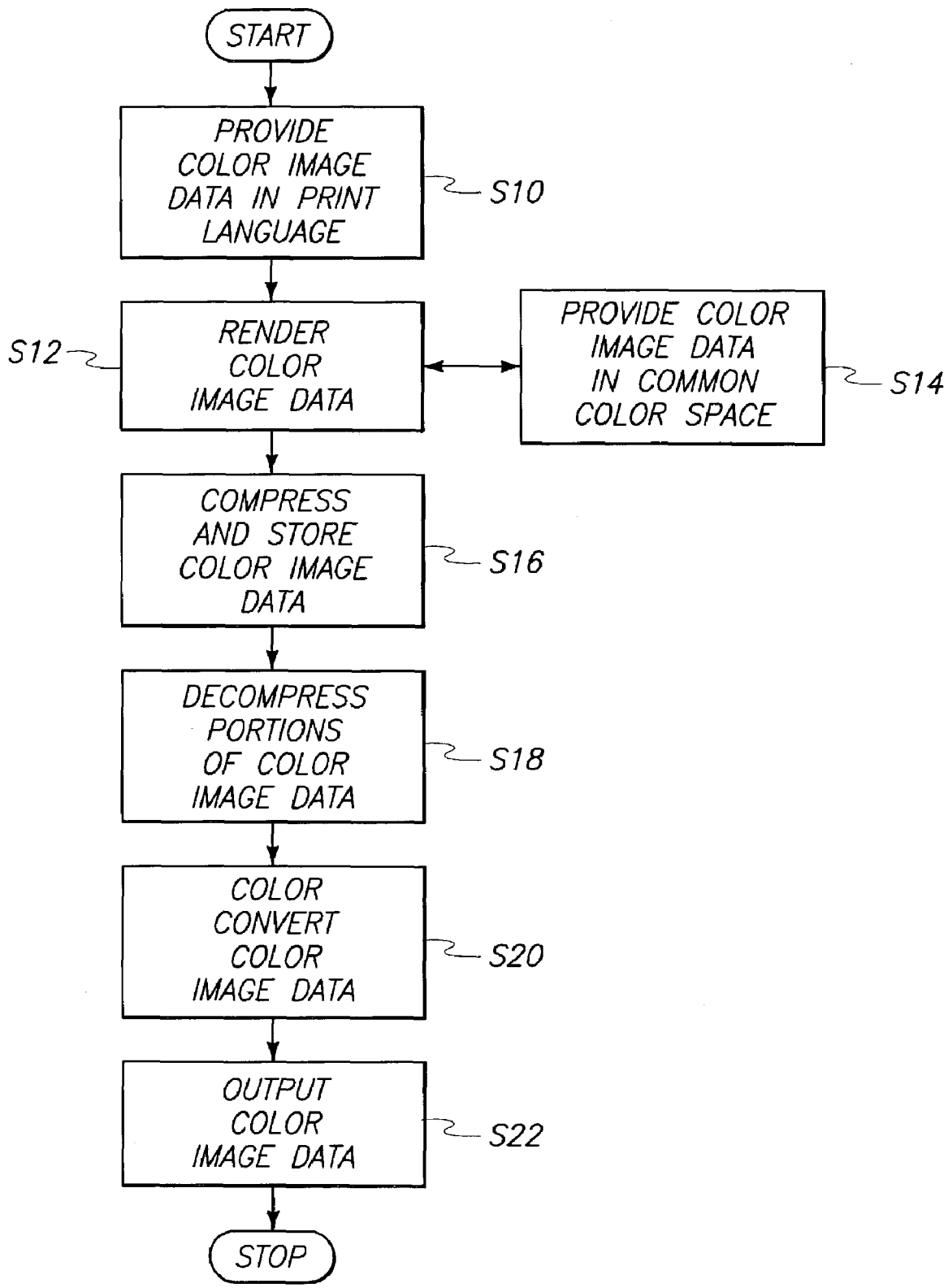

COLOR IMAGING DEVICES, COLOR IMAGE FORMING METHODS, AND COLOR IMAGE DATA PROCESSING METHODS

BACKGROUND

Computer systems including personal computers, workstations, hand held devices, etc. have been utilized in an increasing number of applications at home, the workplace, educational environments, entertainment environments, etc. Peripheral devices of increased capabilities and performance have been developed and continually improved to extend the functionality and applications of computer systems. For example, imaging devices, such as printers, have experienced significant advancements including refined imaging, faster processing, and color reproduction.

Color imaging devices are becoming increasingly popular as the desire for color imaging capabilities continues to increase. For example, personal imaging of color photographs, documents, graphics, etc. is becoming increasingly popular. Inkjet printer and color laser printer designs have made remarkable progress in an effort to accommodate the desire for improved color imaging capabilities.

In general, color imaging devices perform color separation processing to convert color image data from an initial color space to a proper output color space to accurately provide reproduction of images using the color imaging devices. Color separation processing including color space conversion provides the color image data to be imaged in an appropriate color space for accurate color reproduction. Some color separation processes reduce or minimize the amount of hardware and processing used to implement color space conversion. Color separation methods using interpolation reduce processing complexity and hardware requirements. Interpolation may utilize a plurality of interpolation regions to generally identify the location of a desired converted value for a respective input value. However, some interpolation regions may have increased sensitivity to interpolation resulting in an increased number of inaccuracies in resultant or outputted images.

DESCRIPTION OF THE DRAWINGS

FIG. 5 is a flow chart illustrating exemplary processing of color image data within the color imaging device according to one exemplary embodiment.

DETAILED DESCRIPTION

Figure 1:
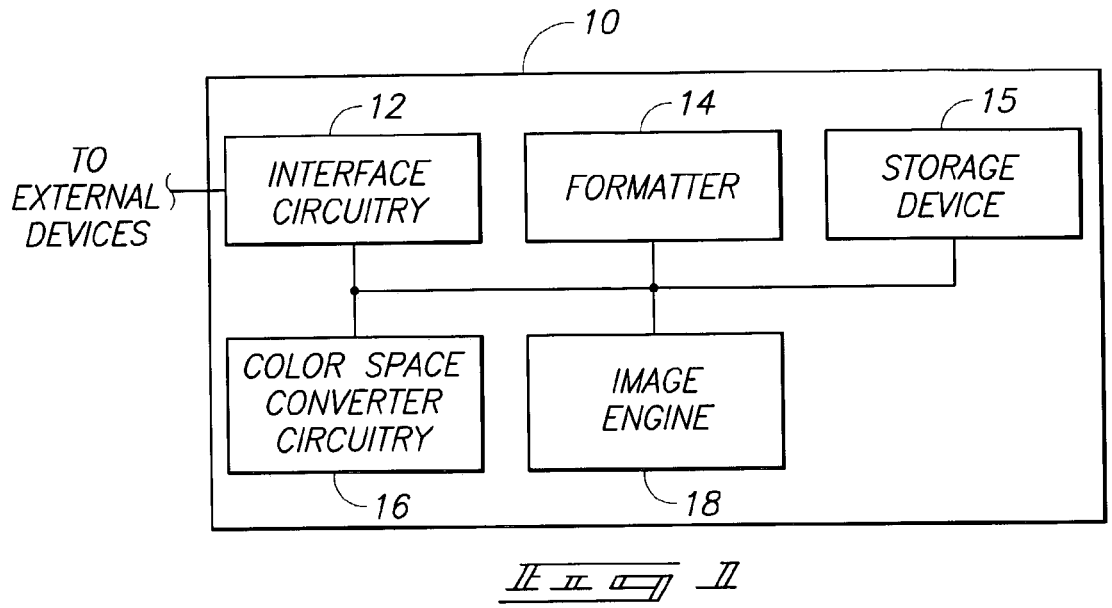
FIG. 1 is a functional block diagram of a color imaging device according to one exemplary embodiment.

According to one embodiment, a color media imaging device comprises interface circuitry configured to access color image data comprising a plurality of initial values for a plurality of pixels of a first color space, translating circuitry coupled with the interface circuitry and configured to receive the initial values and to provide a plurality of respective translated values responsive to the received initial values, color space conversion circuitry coupled with the translating circuitry and configured to convert the translated values to a plurality of respective converted values of a second color space different than the first color space, and an image engine coupled with the color space conversion circuitry and configured to form a color image using the converted values of the second color space.

According to another embodiment a color imaging device comprises means for interfacing for accessing color image data comprising a plurality of initial values for a plurality of pixels of a first color space, means for translating for receiving the initial values and for providing a plurality of respective translated values responsive to the received initial values, means for color space conversion for converting the translated values to a plurality of respective converted values of a second color space different than the first color space, and means for imaging for forming a color image using the converted values of the second color space.

According to an additional embodiment, an article of manufacture comprises processor-usable media comprising programming configured to cause processing circuitry to access color image data for a plurality of pixels of a first color space and corresponding to an image, wherein individual ones of the pixels are one of a plurality of pixel types, translate the provided color image data of the first color space providing translated color image data for the pixels comprising a predetermined pixel type, convert the translated color image data to provide color image data of a second color space for the pixels comprising a predetermined pixel type, and output the color image data of the second color space for use in the generation of color images.

According to still another embodiment, a color image forming method comprises providing a color media imaging device, providing color image data for a plurality of pixels of a first color space and corresponding to an image, wherein individual ones of the pixels are one of a plurality of pixel types, translating the color image data of the first color space providing translated color image data for the pixels comprising a predetermined pixel type, color space converting the translated color image data of the first color space to provide color image data of a second color space for the pixels comprising a predetermined pixel type, and providing a plurality of colorants upon media according to the color image data of the second color space to form an image.

According to an additional embodiment, a color image data processing method comprises providing color image data for a plurality of pixels of a first color space and corresponding to an image, wherein individual ones of the pixels are one of a plurality of pixel types, translating the provided color image data of the first color space providing translated color image data for the pixels comprising a predetermined pixel type, color space converting the translated color image data to provide color image data of a second color space for the pixels comprising a predetermined pixel type, and outputting the color image data of the second color space for use in the generation of color images using a color imaging device.

Referring to FIG. 1, an exemplary configuration of a color imaging device according to one possible embodiment is depicted with respect to reference character 10. In one embodiment, color imaging device 10 is configured to form hard images including physically rendering color images upon output media (e.g., device 10 may comprise a color laser printer) and be referred to as a color media imaging device. In other hard imaging embodiments, device 10 may be implemented as a copier, facsimile machine, multiple-function peripheral device, or any other device configured to physically render color images upon media. Exemplary media includes paper sheet media, paper roll media, labels, transparencies, etc. In further exemplary embodiments, color imaging device 10 provides color conversion operations described herein with no hard imaging, for example, to provide image data for use in displaying images upon a monitor, color display, projector, or other display device, or in applications wherein hard imaging is not desired.

In the depicted exemplary hard imaging device configuration, color imaging device 10 comprises interface circuitry 12, a formatter 14, a storage device 15, color space converter circuitry 16, and an image engine 18. The depicted configuration is presented to illustrate exemplary aspects of embodiments of the invention and other configurations are possible including more, less or alternative components (e.g., image engine 18 may be omitted in embodiments not generating hard images).

Interface circuitry 12 is configured to access color image data to be imaged using device 10. Color image data may be provided in any usable format, including, for example, a common system-level description, print language (e.g., PCL, Post Script, etc.), graphical images (e.g., JPEG), raw data or in any format capable of being used to generate images. Interface circuitry 12 may comprise a network interface card (NIC), parallel connection, USB port, disk drive circuitry or any other configuration capable of accessing data.

Interface circuitry 12 may access color image data from any appropriate source. For example, the exemplary depicted interface circuitry 12 is coupled with external devices (e.g., host, private network, public network, etc.) and may access color image data therefrom. Interface circuitry 12 may also access internally generated color image data in another possible configuration.

In one embodiment, accessed color image data comprises a plurality of initial values for a plurality of pixels of a color image and provided according to a first or initial color space. Initial or input data or values refer to data or values prior to translating or color space conversion described below. The initial color space may be a device-dependent or device-independent color space and may be RGB, CMY, CMYK, or other appropriate color space. In one exemplary arrangement described herein, an initial color space is a device-independent CMY color space.

Formatter 14 is in communication with interface circuitry 12 and is configured to process color image data received from interface circuitry 12. In one embodiment, formatter 14 renders color image data from a print language format into tone information at a pixel-level. Other rendering or processing of color image data is possible. For example, additional processing may occur with respect to providing color image data into a common color space if color image data of different color spaces is present.

Storage device 15 is configured to store electronic data and/or programming such as executable instructions (e.g., software and/or firmware), data, or other digital information and may include processor-usable media. Exemplary processor-usable media includes any article of manufacture which can contain, store, or maintain programming, data and/or digital information for use by or in connection with an instruction execution system including processing circuitry (e.g., formatter 14 or other processing circuitry of device 10) in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Executable instructions may be stored within storage device 15 to provide image data translation operations and/or image data color space conversion operations according to some embodiments. Appropriate processing circuitry of device 10 (e.g., formatter 14) may execute the executable instructions to provide the translation, color space conversion, and/or other processing of the image data. Exemplary translation and color space conversion operations of image data are described further below.

Color space converter circuitry 16 is configured to perform color conversion operations wherein the color image data is converted from the initial color space to one or more output or other color space in accordance with an exemplary embodiment of the invention. Additional details of color space converter circuitry 16 according to one embodiment are shown in FIG. 2 and are described below.

Image engine 18 is configured to physically render color images upon output media including providing a plurality of colorants upon media according to provided color image data. In one exemplary printer arrangement, image engine 18 is configured as a printer engine of color imaging device 10. At least some configurations of image engine 18 include a development assembly configured to provide one or more colorant marking agent in the form of the image and a fusing assembly configured to affix the marking agent(s) to the media. Marking agents include dry toner, liquid inks, etc. Other arrangements are possible and image engine 18 may be embodied in any configuration capable of generating hard color images upon media.

Figure 2:
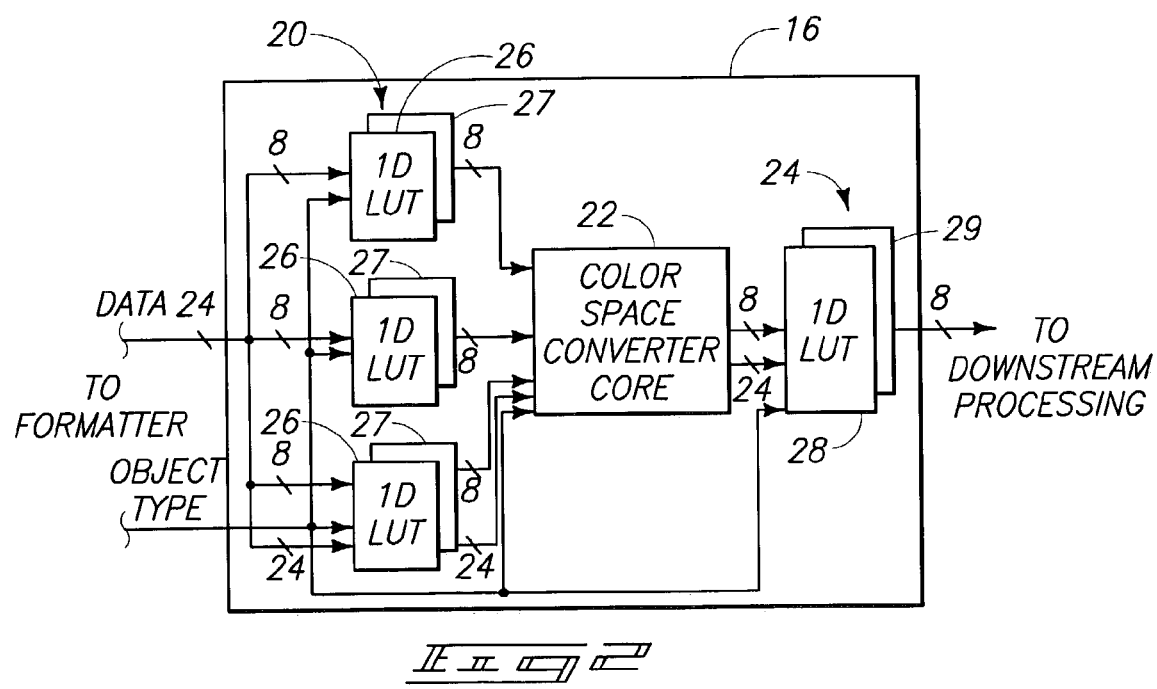
FIG. 2 is a functional block diagram of color space converter circuitry according to one exemplary embodiment.

Referring to FIG. 2, exemplary color space converter circuitry 16 to convert the color space of color image data is shown. The depicted circuitry 16 is arranged to illustrate exemplary aspects of the invention and includes translating circuitry 20, a color space converter core 22, and translating circuitry 24 corresponding to different stages of circuitry 16. Translating circuitry 20 may be referred to as input (or pre) translating circuitry and translating circuitry 24 may be referred to as output (or post) translating circuitry. The indicated components of circuitry 16 are implemented using an Application Specific Integrated Circuit (ASIC) in one arrangement. Other configurations and/or implementations are possible to convert color image data between different color spaces.

Color image data is received at the left side of circuitry 16 from formatter 14 in the illustrated exemplary configuration. Color image data is provided to the left side of circuitry 16 in an initial color space. For example, color image data may be provided as device independent CMY data comprising a plurality of 24 bit triplets individually including 8 bits of cyan data, 8 bits of magenta data, and 8 bits of yellow data for respective pixels of an image.

In one embodiment, color space converter circuitry 16 processes individual colorants in series. For example, the 24 bits of input color image data may be serially processed to provide converted color image data of the output color space for individual colorants in series. In one example wherein the output color space comprises CMYK, circuitry 16 may first process the triplet data to obtain the cyan colorant information, next process the triplet data to obtain the magenta colorant information, next process the triplet data to obtain the yellow colorant information, and finally process the triplet data to obtain the black colorant information for the individual pixel locations. In another embodiment, a plurality of circuits 16 may be provided in parallel and corresponding to respective colorants to provide simultaneous processing of the color image data to provide information regarding respective individual colorants in parallel. Regardless of serial or parallel processing, color space conversion processing (e.g., translating and/or converting) may occur on a pixel-by-pixel basis in at least one embodiment.

The pixels of color image data for a given image may include a plurality of different pixel types. In one example, an image to be formed upon a single sheet of media may comprise text data, line art data, and graphical data. In some embodiments of the invention, color space converter circuitry 16 operates to process pixels differently corresponding to the respective pixel types as described further below. A plurality of pixel identifiers (e.g., object types) may be associated with respective ones of the pixels to control the processing of the color image data for the pixels using circuitry 16 in accordance with the respective pixel types. In one arrangement, formatter 14 comprises circuitry configured to assign pixel identifiers to the respective pixels and associated with the color image data for the respective pixels. An object type pixel identifier may be used to indicate a type of pixel and a type of the color image data associated therewith. An object type pixel identifier may be applied to different stages including translating circuits 20, 24 and color space converter core 22 of circuitry 16 to control processing of the color image data of the respective pixels within one or more of the stages (e.g., processing of image data of a pixel within one or more of circuits 20, 24 and/or core 22 may be implemented responsive to the pixel being identified as a predetermined pixel type (text, graphics, line art in illustrative examples)).

For example, circuitry 16 is configured in one embodiment to convert color image data of an initial color space to an output color space wherein black may be represented in different ways (e.g., different output color space representations). Exemplary different output color space representations of a CMY color space include a first representation wherein pixels having black color information are generated using only CMY colorants (a representation referred to as process K), and a second representation wherein pixels having black color information are generated using a single black color (a representation referred to as CMYK). As mentioned above, it may be beneficial in some applications to image pixels having black color information in different ways (i.e., using plural non-black colorants or a single black colorant) corresponding to the different types of pixels. For example, it may be desired to use CMY space to image graphical pixels while it may desired to use CMYK space to image textual or line art pixels.

The pixel identifiers for respective pixels may be assigned in any appropriate manner. For example, if color image data is text data provided in PCL or Post Script, formatter 14 may readily identify the pixel types of the pixels associated with the data as text data and accordingly assign a common text object type identifier. If the color image data is provided in compressed JPEG format, the formatter 14 may readily identify the pixel types of the pixels associated with the data as graphical data and accordingly assign a different common graphical object type identifier. Formatter 14 may also identify line art color image data by a high level language which typically accompanies the color image data, and assign an appropriate line art object type identifier inasmuch as line art data may be preferably processed as line art data. The above exemplary distinction of processing between CMY (process K) and CMYK color spaces according to graphical and text content is exemplary for illustration purposes and other processing schemes of color image data corresponding to different pixel types and/or conversion to different plural output color spaces may be provided.

Individual pixels may also be identified as NOP pixels wherein no color space conversion processing (e.g., translating and/or converting) by circuitry 16 is desired (e.g., translation and/or conversion is bypassed). The color image data of a NOP identified pixel may pass or travel through circuitry 16 using the indicated exemplary 24 bit bus with no processing being provided by circuitry 20, 22, 24.

The color image data may be divided according to respective colorant bytes and be provided to translating circuitry 20 according to the division in one exemplary embodiment. For example, the illustrated translating circuitry 20 includes a plurality of pairs of addressable tables (e.g., one-dimensional look-up tables (1D LUTs)) 26, 27 corresponding to respective ones of cyan, magenta, and yellow in accordance with the depicted CMY input space example. For a given pixel, a byte of one colorant (cyan) may be provided to one pair of 1D LUTs 26, 27, a byte of another colorant (magenta) may be provided to another pair of 1D LUTs 26, 27, and a byte of a third colorant (yellow) may be provided to the third pair of 1D LUTs 26, 27.

The object type associated with the pixel being processed controls which one of the plurality of 1D LUTs 26, 27 implements translating operations for the respective color image data bytes (e.g., the object type controls which one of the 1D LUTs 26 or 27 of the pairs provides the processing for the respective bytes). Accordingly, in one embodiment, the object type selects 1D LUTs 26 or 1D LUTs 27 of translating circuitry 20 to implement translating operations for a respective pixel.

In one possible arrangement, design of the 1D LUTs 26, 27 may be implemented using a calibration procedure. An input device (e.g., scanner) used to generate the color image data may be tested using a plurality of predetermined test color patches to determine errors between obtained scanned values resulting from scanning operations and the known input colors of the test color patches. The 1D LUTs 26, 27 may be designed using the resultant error information determined from the calibration. Similarly, 1D LUTs 28, 29 of translating circuitry 24 may be designed to reduce or minimize errors resulting from a specific behavior of image engine 18. Additional details regarding exemplary translating operations of circuitry 20, 24 are described below.

In exemplary embodiments, translating circuitry 20 converts an entirety or only portions of individual colorant bytes of color image data to translated color image data. In an exemplary embodiment, the translating circuitry 20 translates the eight bits of individual colorant bytes. In another embodiment, only a portion (e.g., four most significant bits) are translated by circuitry 20 and the four least significant bits of individual colorant bytes are passed without translating. The passed least significant bits may be used for interpolation operations within core 22 in one embodiment.

Accordingly, translating circuitry 20 operates to translate a portion of the bits of individual pixels of the initial color space in one embodiment. In another arrangement, translating circuitry 20 operates to translate all bits of the respective colorants.

Figure 3:
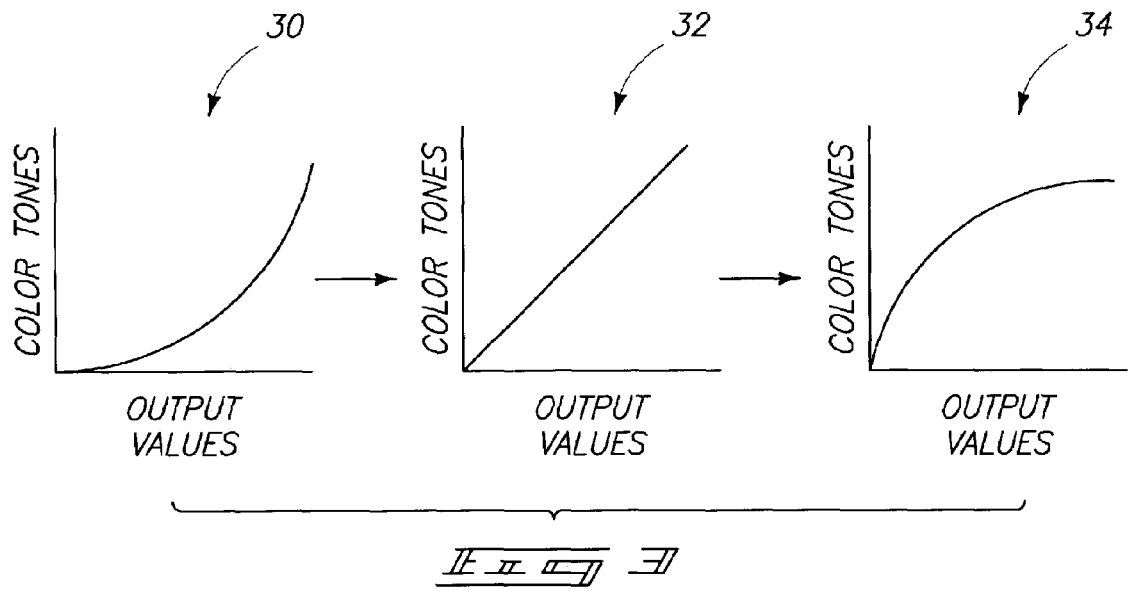
FIG. 3 is an illustrative representation of color image data during different processing points within color space converter circuitry according to one embodiment.

The translating operations of translating circuitry 20, 24 may implement different functions. Referring to FIG. 3, an exemplary linearization translating operation is described. With respect to graphical representation 30, color image data is illustrated with respect to color tones and output values on the respective y and x axes. The depicted exemplary color image data is non-linear in representation 30 due to a non-linear response of the color image data input device (e.g., scanner) in one example. Graphical representation 32 represents translated color image data outputted from translating circuitry 20 and linearized to correct for the input device response. Accordingly, in one embodiment, translating circuitry 20 is configured to provide linearization of non-linear values providing substantially linear color image data wherein non-linear characteristics of an input color space are removed.

The linearized color image data of graphical representation 32 may be applied to RAM address circuitry of color space converter core 22 for color space conversion processing as described further below.

Graphical representation 34 depicts the color image data outputted from translating circuitry 24 (also referred to as translated converted values). Translating circuitry 24 may return the color image data to the original, non-linear response, invert the response (as shown), provide adjustment to data to correct for non-linear characteristics of image engine 18 or other output device, and/or be configured to provide other desired adjustments to the color image data before imaging.

In other embodiments, translating circuitry 20 may also be utilized to expand or compress regions of color image data. For example, processing within color space converter core 22 utilizes interpolation according to at least one embodiment. Translating circuitry 20 may compress some regions of the input color space which are insensitive (or less sensitive) to interpolation errors or approximations and expand other regions of the input color space more sensitive to interpolation errors or approximations (more sensitive than the some regions).

More specifically, exemplary interpolation operations according to exemplary embodiments are described in U.S. Pat. Nos. 6,049,400 A1; 6,040,926 A1; 6,040,925 A1; 6,031,642 A1; 6,028,683 A1; 5,966,474; 5,717,507; and 5,666,437, the teachings of which are incorporated herein by reference. Fixed interpolation intervals over the range of input values may be designated (e.g., 4-bit intervals). Color spaces are often not perceptually uniform, and accordingly, some interpolation regions cause more inaccuracies than others (e.g., have increased sensitivity). Utilization of translating circuitry 20 and translating circuitry 24 enables a user to compress regions of the color space which are relatively insensitive to interpolation (e.g., reduce the number of possible interpolated output values), and accordingly, to expand regions that are relatively sensitive to interpolation (e.g., increase the number of possible interpolated output values) to reduce the number of errors. In particular, the expansion provides additional available output values in sensitive regions (compared with the fixed interpolation intervals) allowing effectively increased resolution in the sensitive areas without additional LUT memory locations.

Figure 4:
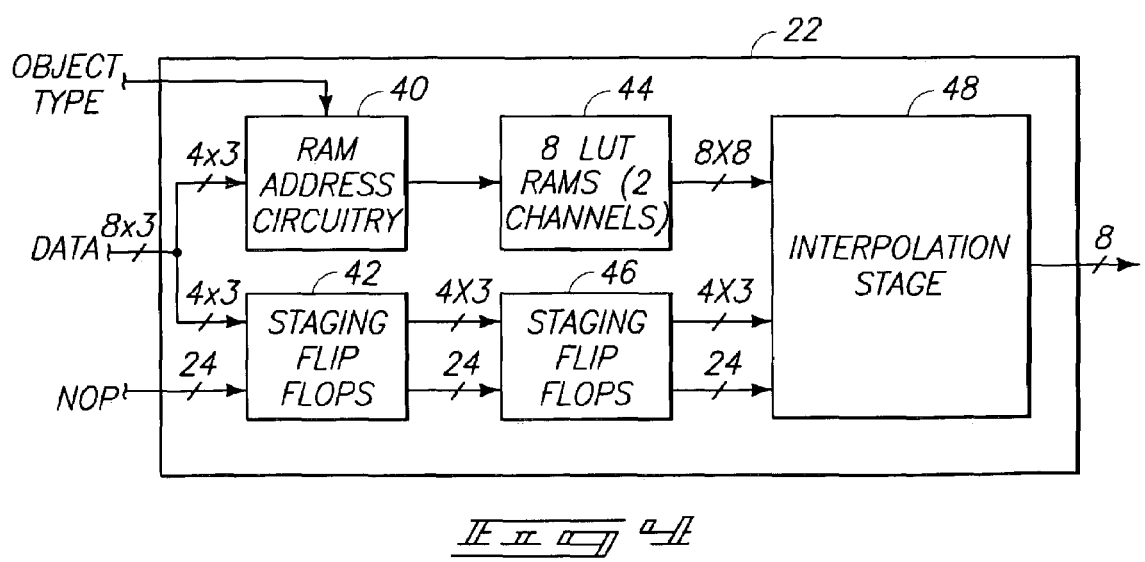
FIG. 4 is a functional block diagram of a color space converter core according to one exemplary embodiment.

Referring to FIG. 4, further details of exemplary color conversion operations of color space converter core 22 including interpolation for converting color image data between different color spaces are described. FIG. 4 shows examples of 3 dimension space conversion, other number dimensions may be converted in other configurations. Additional details of operations of color space converter core 22 are described in the patents incorporated by reference above. In addition, other configurations may be utilized to implement color conversion operations in other embodiments of the invention.

The exemplary circuitry of core 22 includes RAM address circuitry 40, staging flip-flops 42, eight addressable color separation tables (LUTs) 44, staging flip-flops 46 and interpolation stage 48. RAM address circuitry 40 is configured to receive the 4 most significant bits of the three colorant bytes in one embodiment. The 4 least significant bits of the bytes are provided to staging flip-flops 42, 46 which provide appropriate timing to provide the unprocessed least significant data to interpolation stage 48 aligned with the most significant data processed within circuitry 40, 44. The least significant data is utilized by interpolation stage 48 to implement exemplary interpolation operations.

The entire 24 bits may be passed unprocessed through flip-flops 42, 46 to interpolation stage 48 if the current processed pixel comprises a no operation (NOP) pixel wherein the data is staged for timing but not processed (e.g., staging of data for a NOP pixel may also be provided for translation circuits 20, 24). For a NOP pixel, interpolation stage 48 may strip the two bytes for the other colorants not being processed to provide only the 8 bits for the individual colorant currently being processed using core 22.

RAM address circuitry 40 operates to address LUTs 44 using the most significant bits of the three bytes for the three colorants of the pixel being processed. LUTs 44 comprise eight LUTs in one exemplary embodiment configured to provide eight respective vertices of a cube which bound the desired output converted value to be determined by interpolation as described in the patents incorporated by reference above.

In one configuration, the LUTs 44 may be configured to provide a plurality of processing channels corresponding to the respective pixel types of the pixels being processed. For example, if one pixel comprises a text pixel, a first portion of the 8 LUTs 44 may be addressed while if another pixel comprises a graphical pixel, a second portion of the 8 LUTs 44 may be addressed. Accordingly, RAM address circuitry 40 operates in one embodiment to select appropriate respective different portions of the 8 LUTs 44 for color conversion responsive to the object type or other pixel identifier of the pixel being processed.

The plurality of channels of the eight LUTs 44 (corresponding to the pixel types of pixels being processed) may implement different color space conversion operations yielding different converted values corresponding to the respective channels. For example, a converted value determined using one channel may differ from a converted value determined using a different channel. In addition, the converted values resulting from addressing of the different channels may provide conversion (in conjunction with interpolation stage 48) to different output color space representations (e.g., wherein black information is imaged in different ways). In one embodiment, if one pixel is identified as a text pixel, conversion to a first output color space representation (CMY process K) may be provided, while if another pixel is identified as a graphical pixel, conversion to a second output color space representation (CMYK), different than the first output color space representation, may be provided. Identification of the pixel type (e.g., using an object type control signal) of a pixel controls RAM address circuitry 40 to select the appropriate channel of the 8 LUTs 44 to provide the desired color space conversion.

In accordance with exemplary embodiments of the invention, for individual pixels, identification of the pixel types of the pixels dictates the respective representation of the output color space to which the color image data of the pixels will be converted to. For a given image to be imaged (e.g., upon a single sheet of media) and in accordance with one embodiment, one portion of the color image data may be converted to a first output color space representation (corresponding to a first pixel type) and an other portion of the color image data may be converted to a second different output color space representation (corresponding to a second different pixel type). Accordingly, a first portion of memory locations of LUTs 44 may be addressed for some pixels and a second portion of memory locations of LUTs 44 may be addressed for other pixels.

The LUTs 44 output 8 addressed or otherwise identified values (e.g., bytes) for the appropriate channel and which define the 8 vertices of the cube bounding the desired output converted value to be determined by interpolation stage 48. Interpolation stage 48 operates to interpolate the 8 values to define the appropriate converted value to be outputted from core 22. Interpolation stage 48 additionally implements the interpolation operations using the least significant bits staged and aligned with the output of LUTs 44 using staging flip-flops 42, 46. In one embodiment, the 4 least significant bits of the three colorants are used to interpolate between the 8 vertices to obtain the output converted value (e.g., interpolate using the 4 bits in each dimension).

In accordance with at least one exemplary embodiment, the output of interpolation stage 48 is applied to output translating circuitry 24 of FIG. 2 for further processing to provide translated converted color image data as mentioned previously. Alternatively, in another embodiment, output translating circuitry 24 may be omitted and the output of interpolation stage 48 represents the output converted color image data of color space converter circuitry 16 for the respective colorant.

If serial processing using color space converter circuitry 16 is provided, the obtained value for the respective colorant is stored and processing using circuitry 16 is repeated for the other colorants using the same input data for the pixel being processed (e.g., in one arrangement the serial processing may be ordered according to: C,M,Y,K). If parallel processing is provided, the parallel values for the individual color channels are obtained at substantially the same moment in time. The color image data from color space converter circuitry 16 is applied to appropriate downstream circuitry for any subsequent processing (e.g., half toning circuitry not shown) and/or for utilization in the formation of images.

Referring to FIG. 5, processing of color image data within color imaging device 10 is described in accordance with one exemplary methodology. The depicted methodology may be implemented using formatter 14, color space converter circuitry 16, image engine 18 or other components in one arrangement. Other methods are possible including more, less, or alternative steps.

At a step S10, color image data to be imaged within device 10 is converted from a common system-level description to a print language, such as PCL or Post Script. In one arrangement, an external device, such as a host, coupled with interface circuitry 12 provides the conversion operations. Step S10 may be omitted in some arrangements (e.g., raw data is provided for example by a scanner).

At a step S12, the color image data comprising print language data is rendered into tone information at a pixel level by formatter 14. Other processing may also be implemented (e.g., scaling raw image data in terms of resolution).

The processing step S12 may also involve color space conversion to move image elements of the color image data into a common color space at a step S14. Step S14 may implement color correction algorithms using a transfer function of an input device generating the initial color image data in one embodiment.

At a step S16, the color image data may be compressed and stored in a compressed form for printing. The color image data may be stored within appropriate memory circuitry (not shown).

At a step S18, appropriate desired portions of the color image data are decompressed for processing and imaging.

At a step S20, the color image data is color converted into a device-specific color space and separated into respective planes to be imaged (e.g., CMYK) using color space converter circuitry 16.

At a step S22, the color image data is halftoned and applied to video control inputs of image engine 18 for imaging.

Different aspects of inventive embodiments are described. Some exemplary aspects provide translating circuitry configured to stretch or compress appropriate regions of an incoming color space in an effort to provide usage of interpolated regions in a perceptually uniform way. In addition, resulting interpolated data may be independently stretched and compressed in one or more output color space representations. The flexibility to modify color image data of an input color space and/or one or more output color space is provided with reduced or no performance penalties during device operation and with relatively few additional hardware resources in at least one embodiment. In addition, the exemplary translating aspects may be implemented and configured by a user as sequential 32-bit words accounting for proper byte-ordering of various processors. In addition, aspects of at least one embodiment of the invention facilitates testability, control, and observation of all addressable tables.

Other aspects of the disclosed embodiments of color imaging devices provide increased flexibility in color imaging operations. For example, at least one embodiment described herein permits a plurality of different color space conversion systems to be used. The color image data can be processed on a pixel-by-pixel basis wherein individual pixels of a single image may be processed using a plurality of different color treatments, or individual selected pixels of the image may bypass the color space conversion altogether if desired. Some aspects allow different parts of an image to be processed in different respective ways that best suit the individual regions of the image. One embodiment provides selection of different processing on a pixel-by-pixel basis within an image, regardless of the compression used or other factors. These advantages may be implemented in one embodiment with a relatively small or no adverse impact on throughput, while efficiently utilizing interpolation and data handling resources.

Additional exemplary details regarding usage of different color space conversion systems are described in a co-pending U.S. patent application entitled "Color Imaging Devices, Color Imaging Methods, and Color Separation Methods", having client docket no. 100110900-1, filed the same day as the present application, and incorporated by reference herein.

The protection sought is not to be limited to the disclosed embodiments, which are given by way of example only, but instead is to be limited only by the scope of the appended claims.

What is claimed is:

1. A color imaging device comprising:
   interface circuitry configured to access color image data comprising a plurality of initial values for a plurality of pixels of a first color space;
   translating circuitry coupled with the interface circuitry and configured to receive the initial values and to provide a plurality of respective translated values responsive to the received initial values;

color space conversion circuitry coupled with the translating circuitry and comprising interpolation circuitry configured to convert the translated values to a plurality of respective converted values of a second color space different than the first color space and wherein the translating circuitry is configured to compress some regions of the first color space and to expand other regions of the first color space which have increased sensitivity to interpolation errors compared with the some regions; and an image engine coupled with the color space conversion circuitry and configured to form a color image using the converted values of the second color space.

2. The device of claim 1 wherein the initial values have a non-linear response, and the translating circuitry is configured to provide the translated values comprising substantially linear color image data.

3. The device of claim 1 wherein the translating circuitry is configured to linearize the color image data of the initial to substantially remove non-linear characteristics of the color image data of the first color space.

4. The device of claim 1 further comprising additional translating circuitry configured to translate the converted values to provide respective translated converted values, and the image engine is configured to form the color image using the translated converted values.

5. The device of claim 1 wherein the color space conversion circuitry comprises an addressable table configured to provide a plurality of respective addressed values responsive to the translated values, and wherein the interpolation circuitry is configured to interpolate the addressed values to provide the respective converted values.

6. The device of claim 1 wherein the translating circuitry comprises a first table addressable using the initial values to provide the translated values, and the color space conversion circuitry comprises a second table addressable using the translated values to provide the converted values.

7. The device of claim 1 wherein the initial values individually have a respective pixel type corresponding to a respective type of pixel for the individual value, and wherein the color space conversion circuitry is configured to select respective portions of a plurality of addressable tables corresponding to the pixel type of the individual initial value to convert the individual initial value to the respective translated value.

8. The device of claim 1 wherein the converted values are specific to the color imaging device.

9. The device of claim 1 wherein the image engine comprises a print image configured to form the color image as a hard image using media.

10. A color imaging device comprising:

means for interfacing for accessing color image data comprising a plurality of initial values for a plurality of pixels of a first color space;

means for translating for receiving the initial values having a non-linear response and for providing a plurality of respective translated values comprising substantially linear color image data responsive to the received initial values;

means for color space conversion for converting the translated values to a plurality of respective converted values of a second color space different than the first color space; and means for imaging for forming a color image using the converted values of the second color space.

11. A color image forming method comprising:

providing color image data for a plurality of pixels of a first color space and corresponding to an image, wherein individual ones of the pixels are one of a plurality of pixel types;

translating the color image data of the first color space providing translated color image data for the pixels comprising a predetermined pixel type;

color space converting the translated color image data of the first color space to provide color image data of a second color space for the pixels comprising the predetermined pixel type;

providing a plurality of colorants upon media according to the color image data of the second color space to form an image; and wherein the color space converting comprises converting using a plurality of tables, and for an individual pixel, selecting respective different portions of the tables responsive to the respective pixel type of the pixel.

12. The method of claim 11 wherein the providing the color image data comprises providing using an input device having a non-linear response, and the translating comprises linearizing the color image data of the first color space to provide the translated color image data comprising substantially linear image data.

13. The method of claim 11 wherein the translating comprises linearizing the image data of the first color space to substantially remove non-linear characteristics of the color image data of the first color space.

14. The method of claim 11 further comprising translating the color image data of the second color space before the providing the colorants.

15. The method of claim 11 wherein the color space converting comprises addressing the tables using the translated color image data to provide the color image data of the second color space.

16. The method of claim 15 wherein the translating comprises translating using another table comprising a plurality of addressable values, and further comprising addressing the other table using the color image data of the first color space to provide the translated color image data.

17. The method of clam 11 wherein the providing the color image data comprises providing the color image data comprising a plurality of bits for individual pixels, and the translating comprises translating using only a portion of the bits for respective individual pixels.

18. The method of claim 11 further comprising identifying at least one pixel as not comprising the predetermined pixel type, and bypassing the translating and the color space converting of the color image data for the at least one pixel responsive to the identifying.

19. A color image data processing method comprising:

providing color image data for a plurality of pixels of a first color space and corresponding to an image, wherein individual ones of the pixels are one of a plurality of pixel types;

translating the provided color image data of the first color space providing translated color image data for the pixels comprising a predetermined pixel type;

color space converting the translated color image data to provide color image data of a second color space for the pixels comprising the predetermined pixel type;

outputting the color image data of the second color space for use in the generation of color images using a color imaging device; and wherein the color space converting comprises identifying a plurality of values responsive to the translated color image data, and interpolating the values to provide the color image data of the second color space, and wherein the translating comprises compressing some regions of the first color space and expanding other regions of the first color space having increased sensitivity to interpolation errors compared with the some regions.

20. The method of claim 19 wherein the providing comprises providing using an input device having a non-linear response, and the translating comprises linearizing the color image data of the first color space to provide the translated color image data comprising linear image data.

21. The method of claim 19 wherein the translating comprises linearizing the image data of the first color space to remove non-linear characteristics of the color image data of the first color space.

22. The method of claim 19 further comprising translating the color image data of the second color space after the color space converting and before the outputting.

23. The method of claim 19 wherein the color space converting comprises converting using a table comprising a plurality of addressable values to identify the plurality of values, and further comprising addressing the table using the translated color image data.

24. The method of claim 23 wherein the translating comprises translating using another table comprising a plurality of addressable values, and further comprising addressing the other table using the color image data of the first color space.

25. The method of claim 19 wherein the providing comprises providing color image data comprising a plurality of bits for a plurality of individual pixels, and the translating comprises translating using only a portion of the bits for respective individual pixels.

26. The method of claim 19 wherein the interpolating of individual pixels comprises interpolating using one of a plurality of interpolation intervals, and wherein the translating comprises, for an individual pixel, one of compressing and expanding responsive to the corresponding interpolation interval.

27. The method of claim 19 further comprising identifying one of a plurality of pixel types for an individual one of the pixels, and wherein the color space converting comprises converting using a plurality of tables, and for the individual pixel, selecting respective portions of the tables responsive to the respective pixel type of the pixel.

28. A color imaging device comprising:
interface circuitry configured to access color image data comprising a plurality of initial values for a plurality of pixels of a first color space;
translating circuitry coupled with the interface circuitry and configured to receive the initial values and to provide a plurality of respective translated values responsive to the received initial values;
color space conversion circuitry coupled with the translating circuitry and configured to convert the translated values to a plurality of respective converted values of a second color space different than the first color space;
an image engine coupled with the color space conversion circuitry and configured to form a color image using the converted values of the second color space; and
wherein the initial values individually have a respective pixel type corresponding to a respective type of pixel for the individual value, and wherein the color spate conversion circuitry is configured to select respective portions of a plurality of addressable tables corresponding to the pixel type of the individual initial value to convert the individual initial value to the respective translated value.

29. A color image forming method comprising:
providing color image data for a plurality of pixels of a first color space and corresponding to an image, wherein individual ones of the pixels are one of a plurality of pixel types;
translating the color image data of the first color space providing translated color image data for the pixels comprising a predetermined pixel type;
color space converting the translated color image data of the first color space to provide color image data of a second color space for the pixels comprising the predetermined pixel type;
providing a plurality of colorants upon media according to the color image data of the second color space to form an image; and
wherein the providing the color image data comprises providing the color image data comprising a plurality of bits for individual pixels, and the translating comprises translating using only a portion of the bits for respective individual pixels.

30. A color image forming method comprising:
providing color image data for a plurality of pixels of a first color space and corresponding to an image wherein individual ones of the pixels are one of a plurality of pixel types;
translating the color image data of the first color space providing translated color image data for the pixels comprising a predetermined pixel type;
color space convening the translated color image data of the first color space to provide color image data of a second color space for the pixels comprising the predetermined pixel type;
providing a plurality of colorants upon media according to the color image data of the second color space to form an image; and
identifying at least one pixel as not comprising the predetermined pixel type, and bypassing the translating and the color space converting of the color image data for the at least one pixel responsive to the identifying.

31. A color image data processing method comprising:
providing color image data for a plurality of pixels of a first color space and corresponding to an image, wherein individual ones of the pixels are one of a plurality of pixel types;
translating the provided color image data of the first color space providing translated color image data for the pixels comprising a predetermined pixel type;
color space converting the translated color image data to provide color image data of a second color space for the pixels comprising the predetermined pixel type;
outputting the color image data of the second color space for use in the generation of color images using a color imaging device; and
wherein the providing comprises providing color image data comprising a plurality of bits for a plurality of individual pixels and the translating comprises translating using only a portion of the bits for respective individual pixels.

32. A color image data processing method comprising:
providing color image data for a plurality of pixels of a first color space and corresponding to an image, wherein individual ones of the pixels are one of a plurality of pixel types;

translating the provided color image data of the first color space providing translated color image data for the pixels comprising a predetermined pixel type;

color space converting the translated color image data to provide color image data of a second color space for the pixels comprising the predetermined pixel type;

outputting the color image data of the second color space for use in the generation of color images using a color imaging device; and identifying one of the pixel types for an individual one of the pixels, and wherein the color space converting comprises converting using a plurality of tables, and for the individual pixel, selecting respective portions of the tables responsive to the respective pixel type of the pixel.

* * * * *

UNITED STATES PATENT AND TRADEMARK OFFICE
CERTIFICATE OF CORRECTION

PATENT NO. : 7,304,769 B2 Page 1 of 1
APPLICATION NO. : 10/449951
DATED : December 4, 2007
INVENTOR(S) : Bradley R. Larson It is certified that error appears in the above-identified patent and that said Letters Patent is hereby corrected as shown below:

In column 12, line 42, in Claim 17, delete "clam" and insert -- claim --, therefor.

In column 13, line 65, in Claim 28, delete "spate" and insert -- space --, therefor.

In column 14, line 27, in Claim 30, after "image" insert -- , --.

In column 14, line 33, in Claim 30, delete "convening" and insert -- converting --, therefor.

In column 14, line 60, in Claim 31, after "pixels" insert -- , --.

Signed and Sealed this

Nineteenth Day of August, 2008

JON W. DUDAS
*Director of the United States Patent and Trademark Office*